United States Patent Office 3,267,345
Patented August 16, 1966

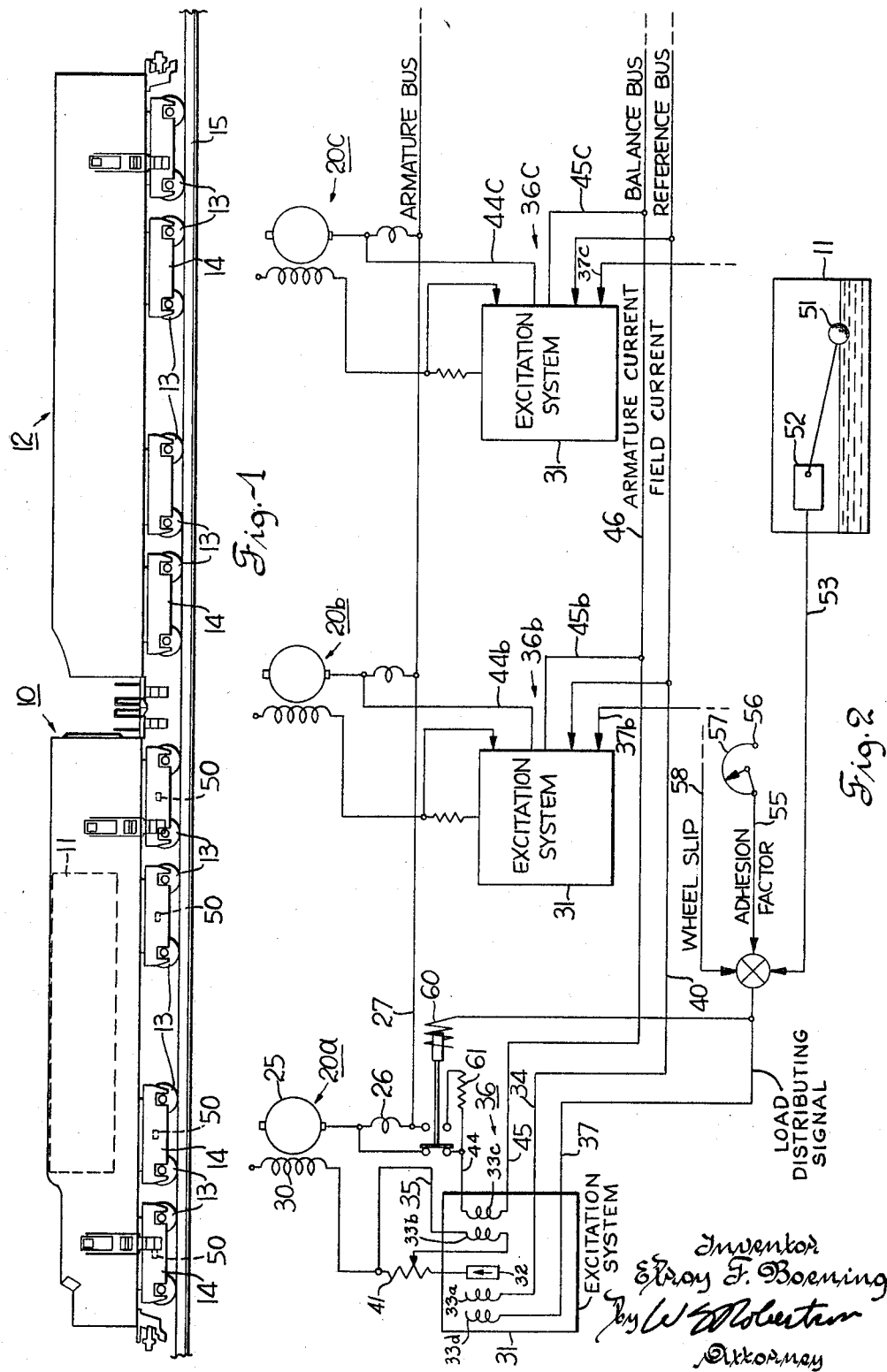

3,267,345
PLURAL MOTOR CONTROL FOR A LOCOMOTIVE WITH ANTI-SLIP AND LOAD DISTRIBUTION
Elroy F. Boening, Milwaukee, Wis., assignor to Allis-Chalmers Manufacturing Company, Milwaukee, Wis.
Filed July 2, 1963, Ser. No. 292,346
8 Claims. (Cl. 318—52)

This invention relates to a control for electric motors that drive a locomotive. More specifically, this invention relates to a control for distributing the load on the motors according to the limit of traction of the wheels on the rails.

The available traction of the driven wheels of a locomotive limits the load and the speed of the locomotive. The available traction of a wheel depends on two factors, the coefficient of friction between the wheel and the rail, called the adhesion factor, and the weight of the locomotive that forces the wheel downward against the rail. Both factors tend to vary so that some wheels have more traction available than others. For example, the fuel that the locomotive carries is a substantial part of the weight on some of the wheels. As the locomotive uses up its fuel, the weight on the fuel carrying wheels decreases, and their available traction decreases. Ice or dirt on the rails, which reduces the adhesion factor, most severely affects the front wheels because they clear the rails and improve the adhesion factor for the rear wheels.

An object of this invention is to provide a new and improved control for a locomotive that distributes the load on the traction motors according to their available traction. Stated in another way, this object is to provide a control that reduces the tractive effort only on individual motors that might lose traction. One advantage of this control is that the locomotive can be driven at the highest speed that the available traction allows.

The control of this invention is intended for a locomotive that has shunt wound D.C. traction motors, and the control includes an individual excitation system for each traction motor. Each excitation system is connected to receive various controlling input signals, including a load distributing signal. The control varies the load distributing signal according to the available traction at the associated wheel. For motors that drive wheels that support a variable weight of fuel, the control varies the load distributing signal according to the weight or the volume of the fuel. Preferably, the control also senses the adhesion factor and varies the load distributing signal according to the adhesion factor.

In the drawing:
FIG. 1 is a side view of two cars of a locomotive with the control of this invention; and
FIG. 2 is a single line schematic of the traction motors and the control of this invention for the locomotive of FIG. 1.

The locomotive shown in FIG. 1 has a car 10 that carries a large fuel tank 11, and it has a car 12 that contains most of the power generating components. Each car 10, 12 has sixteen wheels 13 that are mounted on trunks 14 to support the locomotive on the rails 15. Each pair of wheels 13 on a common axle is driven by a traction motor that will be described later. The weight of the cars 10, 12 provides the downward force for the traction between wheels 13 and rails 15. The fuel in car 10 comprises a substantial fraction of the weight in the car, and the traction of wheels 13 of car 10 decreases considerably as the locomotive consumes its fuel. Car 12 contains mainly fixed components, and its weight does not change appreciably. It is desirable to drive the wheels 13 of car 10 heavily when car 10 is heavily loaded with fuel and to reduce the tractive effort (torque) on these wheels only as may be necessary to maintain traction as the fuel is used up. Some of the reduction of power to the wheels of car 10 can be made up by increasing the power to the wheels of car 12.

FIG. 2 shows three traction motors 20a, b and c that drive three axles on a common truck. Elements associated with a particular motor have the same letter suffix where specific components are referred to. Each motor 20 has an armature winding 25 that is connected through an interpole winding 26 to a common D.C. bus 27. Bus 27 is connected to a suitable source of variable magnitude direct voltage such as the armature of a D.C. generator or a bank of semiconductor rectifiers that couple bus 27 to the armature of an alternator. Each motor 20 has a field winding 30 that is excited by its individual excitation system 31. A source of substantially uniform voltage (not shown) supplies electrical power to each excitation system 31. Each excitation system 31 varies the field current of the associated motor in response to variations that occur at a plurality of inputs 34, 35, 36 and 37.

As is well known, an excitation system 31 may comprise a power stage of controlled rectifiers shown schematically at 32 and a driver stage of magnetic core elements (not shown). The driver stage is connected to control the firing angle of the controlled rectifiers according to inputs 34, 35, 36 and 37 to windings 33 on the magnetic core elements.

Inputs 34, 35 cooperate to establish the value of field current of each exciter (except as these signals are opposed by other elements to provide load distribution). Input 34 of each excitation system 31 is connected to cumulative winding 33A and to a reference bus 40 that is common to all sixteen excitation systems. Input 35 is connected to differential winding 33B and is energized by a measure of the voltage across a resistor 41 connected in series with field winding 30; signal 35 indicates the desired value of field current of the associated motor. When operating personnel increase reference signal 34, excitation system 31 increases the field current until signal 35 to differential winding 33B approximately rebalances signal 34 at the new value of field current.

The personnel operating the locomotive set the potential at field reference bus 40 to a value that corresponds to the desired horsepower of motors 20. Increasing the field current changes the speed-torque characteristics of the motors so that the motors tend to slow down and thereby reduce their load. When the voltage of reference signal 40 is reduced, the excitation systems 31 reduce the field current to the motors 20, and the motors all tend to speed up. Since reference bus 40 is common to all sixteen excitation systems 31, a change in inputs 34 does not redistribute the load, except as the load characteristics of motors 20 differ.

Input 36 is a load balance input that is energized according to the unbalance of the armature current of the motor. It is desirable (but not necessary) to maintain approximately equal armature currents so long as all the wheels have traction. Increasing the field current of the motors with highest armature current and decreasing the field current of the motors with the lowest armature current tends to balance the armature currents. Input 36 is shown in the drawing by a two wire schematic whereas all other circuits in the drawing are shown by a one-line diagram. One line 44 of input 36 is connected to one end of cumulative widing 33C and to the junction of interpole winding 26 and the armature winding 25 of the associated motor. The other line 45 of input 36 is connected to the other end of winding 33C and to a common armature current balance bus 46. The potential across the interpole winding 26 is a measure of the armature current. If the armature currents are equal, the voltages between the lines 44 and 46 balance and there is no current in the circuit of input 36. If the voltages across the interpole windings become unbalanced by unbalanced armature currents, a balance current flows in the circuit of lines 44, 45, 46, the interpole windings and portions of the armature bus 27 in a polarity to increase the field current of the motors with the highest armature current and to decrease the field current of the motors with the lowest armature current. Thus, the purpose of the balance circuit is the opposite of the purpose of the load distributing control. As will be explained later, the control of this invention prevents the load balancing components and the load distributing components from adversely influencing each other.

All sixteen excitation systems may have their load balance circuits 44, 45 interconnected at bus 46, or the circuits can be interconnected to provide load balance only among the motors of a small group.

Input 37 to cumulative winding 33D of excitation system 31 is a load distributing input that is energized by a measure of the available traction (or loss of available traction) to control the field current to limit the load on a motor with reduced available traction. The structure associated with producing input signal 37 will be easier to understand after the effect of signal 37 is explained.

Both the armature voltage and the field current affect the relative load on the motors. Preferably, the control keeps the armature voltage of all the motors 20 equal and keeps the armature voltage constant except to change the power of the locomotive. The control operates on only the field current to distribute the load. One of the advantages of operating on the field current for load distribution is that this does not require any additional capacity in the motors. In the high speed range where available traction may be limited, signal 34 is adjusted to weaken the field. To reduce the tractive effort, input 37 is energized to increase the field current.

For any pair of wheels on a common axle there is some value of tractive effort and speed at which the wheels will begin to slip. One suitable way to prevent the wheel from reaching this load limit is to monitor the wheel torque and speed, to compare this value with the calculated limits for traction and to apply an opposing signal at input 37 as the field current is reduced toward the critical point. However, the control can be made simpler and just as effective by energizing signal 37 according to the maximum available traction throughout the speed range. The resulting unbalance in load in the lower range of tractive effort and speed, although unnecessary from the standpoint of load distribution, does not hurt the motors or reduce their efficiency.

At maximum power short of slip, each motor contributes some preset portion of the entire load. This preset portion can be expressed as a voltage at input 37 (as will be explained). From this viewpoint, it is possible to operate on the load balance circuits 44, 45, 46 to maintain this ratio at all speeds. Preferably, however, control components that will be described later give signal 37 a value corresponding to the reduction from full horsepower required to stay within the limits of available traction at maximum speed. Signal 37 increases the field current of a motor with less available traction so that the motor operates with a substantially fixed reduction in power from the other motors throughout at least the field weakening portion of the motor speed range.

The signal 37 is preferably generated in response to the weight carried by the wheels of an associated truck. One suitable means to generate signal 37 in direct response to the weight is to mount a strain gauge or load cell 50 on the truck or on a component of the car that is deflected by the weight of the car. A means that is preferable is a tank level indicator. As FIG. 2 shows, the indicator may comprise a float 51 and a position transducer 52 mounted in tank 11 that produces an electrical signal 53 that corresponds to the position of float 51. Because the weight of the car changes slowly, the control preferably includes an electrical or mechanical low pass filter in the circuit represented by line 53 or the signal generating means 50, 51, 52.

Preferably, input 37 also receives a signal 55 that is manually or automatically adjustable with changes in the adhesion factor. Means for generating signal 55 may comprise a substantially constant voltage source 56 and a potentiometer 57. Operating personnel can adjust signal 55 to limit power to the front wheels when the personnel observe that slippage occurs or is liable to occur because the tracks are icy or dirty.

Wheel slip detectors for traction motors are well known. Although shunt motors tend not to slip (as compared with series motors) the control preferably includes a suitable wheel slip detector (not shown) that is connected to produce a signal 58 at input 37 to increase the field current whenever the associated wheel slips.

The input 37 is energized to reduce the power of a motor, and the load balance circuit tends to operate to restore the balance (except for components of the control that will be described). Preferably, the control prevents the load distributing components and the load balance components from interfering with each other. As FIG. 2 shows, in the control for motor 20a, preferably the load balance circuit of a controlled motor is open circuited by a relay 60 that is responsive to the energization of input 37. Relay 60 may be connected to connect an equivalent conductance 61 in the load balance circuit to keep the load on the balance circuit the same. With or without conductance 61, conductors 44b, 45b, 44c and 45c form an independent balance circuit for motors 20b, 20c.

If desired, the load balance circuit can be maintained operating but adjusted to compensate for the difference in armature current that signal 37 produces. For example, a voltage proportional to signal 37 can be inserted in the balance circuit to add to the voltage produced by the interpole winding. The balance circuit would operate to maintain the armature currents balanced except for the difference represented by this voltage.

Signal 37 and the components that produce signals 37b and 37c are not shown. Either or both motors 20b and 20c may have separate components like the ones that produce signal 37a for motor 20a to produce signals 37b, 37c. Either motors 20b or 20c may be connected to respond to signal 37a or to components 53, 55, 58, of signal 37a combined with separately generated components of signals 37b, 37c.

Those skilled in the art will recognize many variations of the specifically described control within the scope of the claims.

Having now particularly described and ascertained the nature of my said invention and the manner in which it is to be performed, I declare that what I claim is:

1. A control for a plurality of electric shunt wound D.C. motors of a traction vehicle, comprising
   an excitation system for each of said motors operable to control the field current of said motor and having a plurality of inputs and varying said field current as a function of signals applied to said inputs,
   means connected to first inputs of all of said excitation systems for varying the field current of all of said motors simultaneously, whereby the speed of all of said motors is increased when said signal to said first inputs is in a direction to weaken field current,
   means connected to second inputs of all of said excitation systems for balancing the armature currents of said motors,
   means responsive to the weight carried by selected wheels of said vehicle and being coupled to a third input of the energization system associated with the motor which drives said selected wheels for generating a load distribution signal which is a function of the change of weight carried by said selected wheels, said load distribution signal generated in response to said reduction in weight energizing said excitation system to increase said field current, and means responsive to a predetermined magnitude of said load distribution signal for disabling the armature current balancing means connected to said second input of the excitation system associated with said selected wheels.

2. A control in accordance with claim 1 and including manually operated means for controlling the magnitude of said load distribution signal as an inverse function of the coefficient of friction between said selected wheels and the tracks which support them, thereby permitting operating personnel to limit power on said selected wheels when the tracks are icy and slippage is liable to occur.

3. A motor control for a traction vehicle having a first group of shunt wound D.C. motors driving wheels supporting a weight-variable portion of the vehicle and a second group of shunt wound D.C. motor driving wheels supporting a relatively invariant-weight portion of the vehicle, comprising an excitation system for each said motor, said excitation system having a plurality of inputs and controlling the field current of the associated motor as a function of incoming signals to said inputs, means coupled to first inputs of all of said excitation systems for varying the field current of all of said motors together, and means connected to second inputs of the excitation systems of said first group of motors for generating an electrical load distribution signal which is a function of change in weight of said weight-variable portion of said vehicle, said signal generated in response to reduction in weight of said weight-variable portion energizing said excitation system to increase said field current, whereby the traction effort of said first group of motors is kept within the available traction of the wheels driven thereby.

4. A control in accordance with claim 3 and including armature current balancing means coupled to third inputs of all of said excitation systems for maintaining approximately equal armature currents in all of said motors, and means operable in response to a predetermined magnitude of said load distribution signal to disconnect said armature current balancing means from said excitation systems of said first group of motors.

5. A control in accordance with claim 4 and including means responsive to slippage of said wheels supporting said weight-variable portion of said vehicle for varying said load distribution signal in a direction to increase said field courrent.

6. A control for a plurality of shunt wound D.C. motors each driving its own group of wheels on a traction vehicle, comprising an excitation system for each said motor, said excitation system having a plurality of inputs and controlling the field current of the associated motor as a function of incoming signals to said inputs, means coupled to first inputs of all of said excitation systems for varying the field current of all of said motors simultaneously, and means coupled to a second input of a selected excitation system for generating a load distribution signal which is a function of the traction at the wheels driven by the motor associated with said selected excitation system, said signal generating means being connected to energize said selected excitation system to vary said field current as an inverse function of traction, whereby said load distribution signal generated in response to loss of traction opposes signals to said first inputs tending to weaken the motor field and increase motor speed.

7. A control in accordance with claim 6 in which said signal generating means includes means for sensing the volume of fuel supported on said wheels driven by the motor associated with said selected excitation system.

8. A control in accordance with claim 7 and including means for varying the magnitude of said load distribution signal as an inverse function of the coefficient of friction between said wheels and the rails which support them.

References Cited by the Examiner

UNITED STATES PATENTS

| 1,877,681 | 9/1932 | Mickey | 318—100 |
| 2,315,386 | 3/1943 | Baldwin | 318—52 |
| 2,712,622 | 7/1955 | Brown | 318—100 X |
| 3,064,371 | 11/1962 | Kutzler. | |

FOREIGN PATENTS

| 865,357 | 4/1961 | Great Britain. |
| 873,374 | 7/1961 | Great Britain. |

ORIS L. RADER, *Primary Examiner.*

T. LYNCH, *Assistant Examiner.*